3,641,124
HEPTAMINOL TRANS-CINNAMATE
Bernard Pourrias, Meudon, Yves Huet, La Celle Saint-Cloud, and Carlos Pomaret, Paris, France, assignors to Delalande S.A., Courbevoie, Hauts-de-Seine, France
No Drawing. Filed Sept. 20, 1968, Ser. No. 761,324
Claims priority, application France, Sept. 25, 1967, 122,143
Int. Cl. C07c 91/04
U.S. Cl. 260—501.17     1 Claim

ABSTRACT OF THE DISCLOSURE

Heptaminol cinnamate, useful as a myocardiotonic, coronary dilatator and uricosuric having diuretic activity and a process for making same which comprises reacting cinnamic acid with heptaminol.

---

The present invention relates to heptaminol cinnamate of the formula

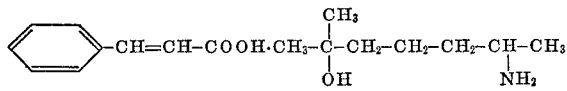

and its method of preparation. The process according to the invention comprises salifying cinnamic acid with heptaminol.

The following preparation is given by way of example to illustrate the invention:

EXAMPLE 0.2 mole of heptaminol is added to a hot solution of trans-cinnamic acid (0.2 mole) in absolute ethanol (200 ml.); the major proportion of the alcohol is driven off by distillation under reduced pressure and the concentrated solution is allowed to cool. The product crystallises. It is then dried and recrystallised from ethyl acetate (500 ml.).

The heptaminol cinnamate is in the form of white crystals having a definite melting point=118° C. It is soluble in water and ethanol.

Elementary analysis.—Calculated for $C_{17}H_{27}NO_3$ (percent): C, 69.59; H, 9.28; N, 4.77; O, 16.36. Found (percent): C, 69.92; H, 9.20; N, 4.92; O, 16.46.

Heptaminol cinnamate, studied in animals has shown interesting pharmacological properties, and in particular a mycardiotonic action, an effect on uricaciduria as well as coronaro-dilatory properties.

(1) Myocardiotonic action

This activity has been observed in cats and dogs from which the strength of cardiac concentrations has been studied by means of a constraining gauge of Brodie and Walton (Proceedings of the Society of Experimental Biology and Medicine 1953, No. 84, page 263), placed on the right ventricle after oepning of the thorax and connected to an electronic apparatus and to a polygraphic recording apparatus.

The dose of 15 mg./kg. of heptaminol cinnamate, administered intravenously increases the initial contractile force by 50%. This myocardiotonic action has also been observed when recording the amplitude of the contractions of a heart in situ or of an isolated heart kept alive in a thermostatic medium by perfusion of a suitable liquid.

(2) Coronaro-dilatatory action (a) *Isolated heart.*—The increase of the coronary circulation rate has been observed in the isolated heart of a rabbit, according to the technique of Langendorff (Pfluegers Archiv fuer die gesamte Physiologie des Menschen und Tiere, 1895, 61 page 291 and following).

(b) *Heart in situ.*—The coronary rate has been studied in dogs and has been measured by tapping off the blood of the coronary veinous sinus by means of a probe introduced either transauricularally after thoracotomy after the method of Moranitz and Zann (Zentralblat fuer Physiologie, 1912, 26, page 465 and following) or by means of the jugular vein, with closed thorax, according to the technique of Dutril and Bourillet (Comptes rendus des seances de la Societe de Biologie, 1959, 153, page 995 and following). In a dog the following results have been obtained:

TABLE I

| Dose in mg./kg. administered intravenously: | Percentage increase of the coronary veinous sinus rate |
|---|---|
| 10 | 30 |
| 15 | 50 |

(3) Other effects on the cardio-vasculatory system

In comparison with heptaminol hydrochloride, heptaminol cinnamate shows adrenolytic properties which can be characterised by: a reduction of hypertension resulting from the stoppage of carotides in the dog; a lessening of the hypertensive response to the intravenous injection of adrenalin into the dog, the cat and the rabbit.

These two effects have been observed following the injection of 10 mg./kg. of heptaminol cinnamate intravenously into each animal experimented on.

It results in an increased stability of the arterial tension compared to that which is obtained with heptaminol hydrochloride, which, in certain cases affords a distinct advantage. Thus this dose of 10 mg./kg. of heptaminol cinnamate has not brought about, in the course of experiments carried out on the dog, an increase in arterial tension. In other respects, the studies of the femoral rate carried out on rabbits according to the technique of Salle (Therapie 1953, 8, page 569 and following) has not revealed a vaso-constricting effect, in doses of 250 and 500 g./kg. intraarterially.

(4) Effect on uricaciduria

The preceding effects are completed by interesting uricosurical properties which constitute a further characteristic of the compound with respect to that of heptaminol hydrochloride. These properties have been studied in anesthetised or awake dogs, cats and rats either intravenously, intramuscularly or intra-duodenally. The following table shows this activity as compared with a control (untreated) group:

TABLE II

| Animal | Method | Dose, mg./kg. | Increase of the uraturia, percent | Lessening of the uricemia, percent |
|---|---|---|---|---|
| Dog | Intravenously | 10 | 100 | 25 |
|  | Intraduodenally | 40 | 100–200 | 50 |
| Cat | Intravenously | 10 | (¹) | 85 |
| Rat | Intramuscularly | ² 50 | 100–200 | 25–50 |

¹ Not studied.
² Twice at 48 hour intervals.

In the case of rat, by oral methods, 100 mg./kg. increased the uraturia of the animal by 100% and lessened the uricemia by 30% between them.

(5) Diuretic action

In dogs and rats there has been observed, at the end of the administration of the heptaminol cinnamate in a dose of 10 mg./kg. intravenously or of 100 mg./kg. intraduodenally or orally, a diuretic action shown by an increased elimination of water and electrolytes.

These interesting myocardiotonic coronaro-dilatatory and uricosurical properties make heptaminol cinnamate a useful medicament in the treatment of complicated or non-complicated cardiopathies, of hyperuricemia, and of arteriosclerosis as well as in the treatment of afflictions characterised by an essential hyperuricemia such as gout or uric lithiasis. It is as so administered in a clinic, that heptaminol cinnamate has given results which have been particularly satisfactory without the manifestation of troublesome side effects.

The different solid or liquid pharmaceutical forms, intended to be administered to man by oral, rectal, or parenteral means, such as ordinary or sugar coated tablets, capsules, enteric or delayed release capsules, drinkable or injectable solutions or suppositories containing heptaminol cinnamate as the principal active agent, are obtained according to the art together with the usual excipients; e.g. starch, talc, stearates, lactose, resins, polyoxyethylene glycols, gelatine, aqueous or oily carriers, naturally occurring or synthetic excipients for suppositories, emulsifiers, adjuvants, preservatives and assorted flavorings.

The active therapeutic doses vary according to the subject and the gravity of the case. In general, the daily posology for a patient is in the range between 0.1 gram of heptaminol cinnamate, and each tablet or the like preferably contains from 0.25 gram to 0.5 gram of heptaminol cinnamate.

What we claim is:
1. Heptaminol trans-cinnamate of the formula:

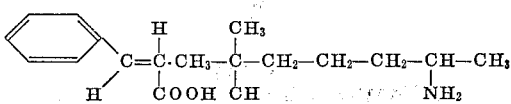

References Cited
UNITED STATES PATENTS 3,256,332    6/1966    Lassen _____ 260—501

FOREIGN PATENTS 980,828    1/1965    Great Britain _____ 260—501.11

OTHER REFERENCES

The Merk Index, Merck & Co. Inc., Rahway, N.J., 7th edition, p. 512 (1960), RS 35b M 524.

LEON ZITVER, Primary Examiner

M. W. GLYNN, Assistant Examiner

U.S. Cl. X.R.

424—316